United States Patent [19]
Oestmann

[11] 3,910,133
[45] Oct. 7, 1975

[54] CONTROL LINKAGE FOR HYDROSTATICALLY POWERED DRIVE AND STEERING SYSTEM OR THE LIKE

[75] Inventor: Eldon Dale Oestmann, Washington, Ill.

[73] Assignee: Caterpillar Tractor Company, Peoria, Ill.

[22] Filed: June 24, 1974

[21] Appl. No.: 482,511

[52] U.S. Cl. .................... 74/479; 74/474; 74/512; 74/526
[51] Int. Cl.² .................... G05G 1/14; G05G 11/00
[58] Field of Search ............ 74/474, 479, 512, 526

[56] References Cited
UNITED STATES PATENTS

| | | | |
|---|---|---|---|
| 3,241,394 | 3/1966 | Rubenstein | 74/512 |
| 3,525,266 | 8/1970 | Brooks et al | 74/481 |
| 3,537,328 | 11/1970 | Allen | 74/512 X |
| 3,688,598 | 9/1972 | Rolland | 74/479 |
| 3,722,314 | 3/1973 | Sorenson et al. | 74/512 |

*Primary Examiner*—Allan D. Herrmann
*Attorney, Agent, or Firm*—Ralph E. Walters

[57] ABSTRACT

An arrangement for controlling a bidirectionally movable member is provided which bidirectional movement is used, for instance, to vary the drive or steering attitude of a vehicle. The control arrangement has two separate, independently operative input members for driving a single output member in either one of two opposite linear directions. Each element of the control arrangement operates independently of the other so that actuation of the one does not actuate or move the other. The linkage between the input controls and the output member includes elements that produce an infinite amount of movement of the output member to affect a fine or precise control thereof.

10 Claims, 3 Drawing Figures

CONTROL LINKAGE FOR HYDROSTATICALLY POWERED DRIVE AND STEERING SYSTEM OR THE LIKE

BACKGROUND OF THE INVENTION

1. Field of the Invention

This invention relates to a control linkage and, more particularly, to a control arrangement for bidirectional movement of an output member or the like.

2. Description of the Prior Art

Heretofore, there have been many bidirectional control arrangements, for instance, in a vehicle having a hydrostatic transmission whereby an operator could maneuver either the speed or direction of the vehicle by manipulation of two or more levers such as foot pedals. Several of these prior arrangements require different foot manipulations to accomplish the desired result. As a result of the differences between the different methods of operation, it becomes quite confusing and, in fact, dangerous for an operator to change from one type vehicle to another since actuation of a lever with one foot may, on one vehicle, serve a braking function and, on another vehicle, serve a turning function.

In addition, current arrangements have the actuating levers or pedals interconnected in such a way that depression or movement of one causes movement of the other. Each pedal is connected to the actuating mechanism by a link connected at different relative points on the pedal, i.e. on opposite sides of the pivot axis of the pedals, resulting in a different "feel" for the operator in actuating the pedals. As a result, the operator must learn to use different foot pressures at different points in order to get the equivalent (but opposite) movement from the output of the mechanism. An override pedal is sometimes provided which can be actuated to negate the movement from the regular foot pedals.

SUMMARY OF THE INVENTION

A bidirectionally movable output member is driven by an actuator mechanism for actuating a function, such as a three-position valve having a neutral position and a left and a right extreme position. The actuator mechanism has at least one pair of levers or pedals which are connected to a balance lever and in turn to a crank for producing the bidirectional linear movement of the output member. The actuator mechanism has structure whereby each lever of pedal may be depressed or raised without any mechanical connection to or movement of the other lever or pedal and since the levers or pedals are identically mounted and the connections from said levers or pedals to parts of the actuating mechanism are identical, the "feel" or "touch" by the operator on the levers or pedals is the same making it possible to accurately control the resulting output of the mechanism.

A relatively simple linkage arrangement is provided which overcomes the problems of the prior art and is relatively inexpensive to build and to maintain and is relatively simple to operate while producing very accurate and/or precise results.

BRIEF DESCRIPTION OF THE DRAWINGS

The details of construction and operation of the invention are more fully described with reference to the accompanying drawings which form a part hereof and in which like reference numerals refer to like parts throughout.

In the drawings.

DESCRIPTION OF THE PREFERRED EMBODIMENT

Figure 1:
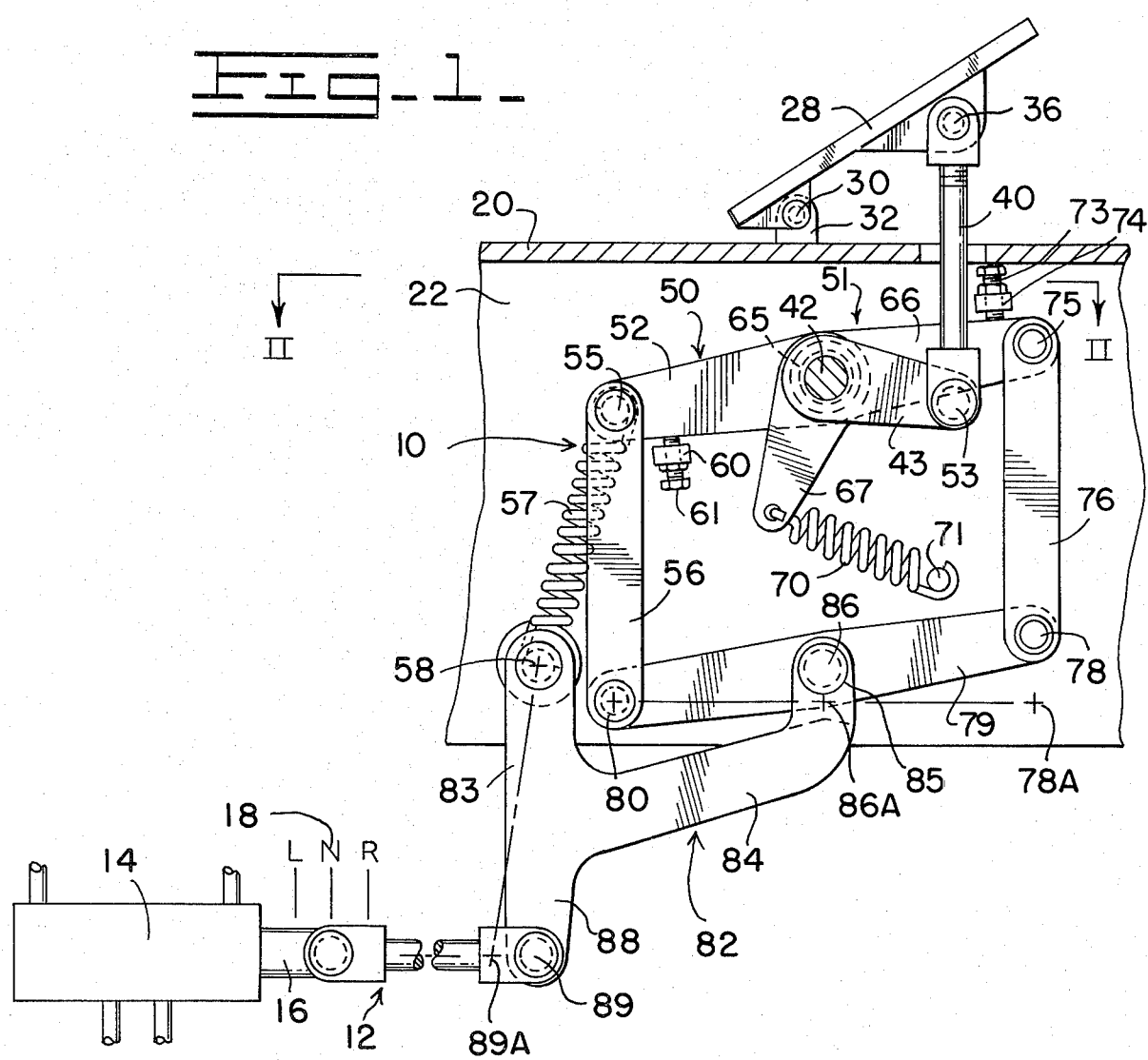
FIG. 1 is a side elevational view of the present invention with parts in section and being shown connected to a four-way, three-position valve.

Referring to the drawings in more detail and, in particular, to FIG. 1, an actuator mechanism 10 is provided for producing a bidirectional movement of an output member 12 which, in the illustrated embodiment, is connected to a four-way, three-position control valve 14. For the present purposes, the invention will be described as applied for use in actuating the control valve 14 of a hydrostatic transmission (not shown) of a vehicle, such as a loader vehicle or the like. The control valve 14 has a valve spool 16 which is infinitely adjustable in either direction from a neutral or centered position 18. As the valve spool 16 moves slowly to the left of the neutral position 18, appropriate parts in the valve 14 are gradually aligned either to turn the vehicle to the left or to raise the fork of a forklift or the like. Likewise, as the valve spool 16 moves to the right of the neutral position 18, the vehicle will be either turned to the right or the fork of the forklift or the like will be lowered. The control valve 14 and its actuation by the valve spool 16 is not considered to be part of the invention but is described briefly for illustration purposes.

The vehicle upon which the actuator mechanism 10 is mounted has a floorboard or operator's platform 20 with a pair of parallel, spaced apart vertical walls 22, 24 extending substantially perpendicular thereto. A pair of foot pedals 26,28 are each pivotally connected to the platform near one end portion of each pedal by aligned pins 30 passing through aligned upstanding lugs 32 affixed to the floorboard or platform 20. The other end portion of each pedal 26,28 has pivotally mounted thereto, as by means of pins 34,36, one end portion of the adjustable links 38,40, respectively. The respective adjustable links 38,40 are individually connected to the actuator mechanism 10 for affecting a desired movement which will be transmitted through said actuator mechanism 10 to the output member 12.

Figure 2:
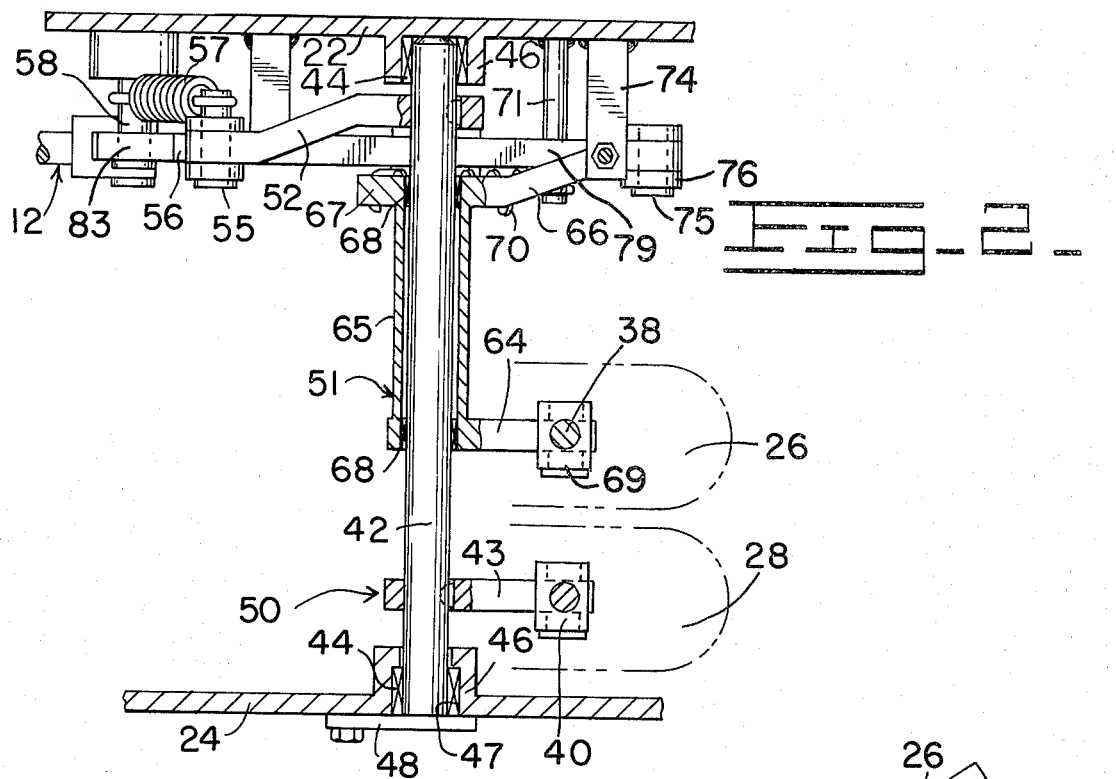
FIG. 2 is a top plan view in cross section taken along the lines 2—2 of FIG. 1; and, FIG. 3 is a side elevational view similar to FIG. 1 only with the right foot pedal depressed.

The actuator mechanism 10 has a cross-shaft 42 mounted in bearings 44 seated in aligned bearing mounts 46 carried by the depending walls 22,24. As shown in FIG. 2, access to the one bearing 44 and the shaft 42 is obtained through an opening 47 in the wall 24 which opening is covered by a pivoted cover 48. A pair of bell cranks 50,51 are connected to the pedals 28,26, respectively, through the adjustable links 40,38. Each link 38 and 40 is adjustable in length by means of interfitting threaded portions which when turned relative to each other lengthens or shortens the link.

Specifically, bell crank 50 is comprised of the cross-shaft 42 having a lever 43 keyed to one end portion thereof and another lever 52 keyed to the opposite end portion of said cross-shaft and extending in a direction generally opposite to said lever 43. The lever 43 is pivotally pinned at 53 to the end of the adjustable link 40. A pivot pin 55 passes through the remote end of lever 52 for pivoting the lever 52 to a link 56 and for supporting one end of a spring 57 which has its other end connected to a fixed pivot 58 mounted on the wall 22. An adjustable stop 60 is mounted on the wall 22 and has a threaded member 61 in alignment with the lever 52 such that the spring 57 will hold the lever 52 against the member 61 as the rest of the bell crank 50, including cross-shaft 42 and lever 43, is urged in a counterclockwise direction with the link 40 and pedal 28 in the upmost position (FIG. 1).

Figure 3:
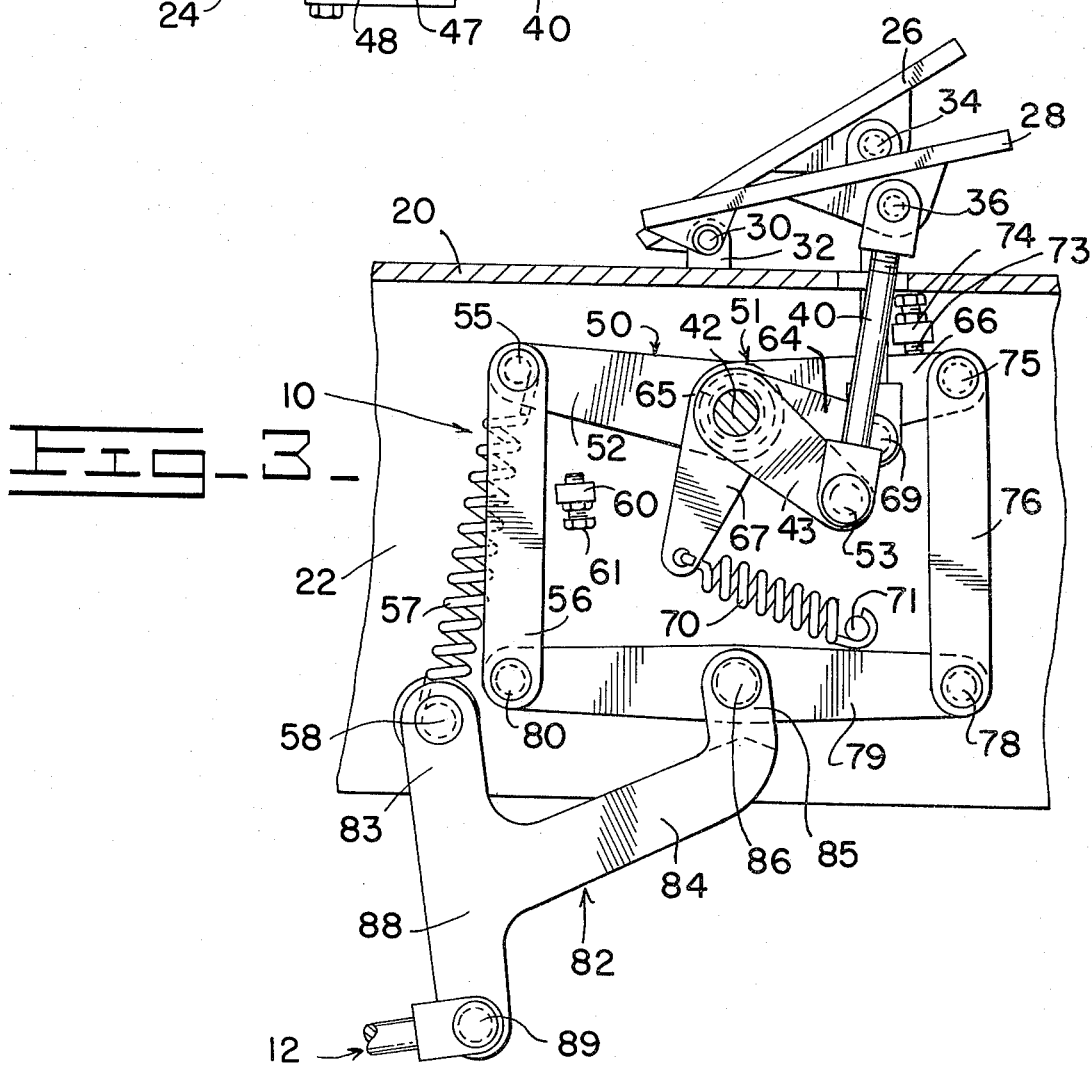

The bell crank 51 is comprised of a first lever 64 integrally formed to one end of a sleeve 65 which has a second and a third radially extending lever 66,67, respectively, integrally formed on the other end thereof. The first lever 64 and the second lever 66 both extend generally from the same side of said sleeve 65. The sleeve 65 is concentrically mounted for rotation relative to the cross-shaft 42 by means of bearings 68 between said sleeve 65 and said cross-shaft 42. The first lever 64 is pivotally pinned at 69 to the end of the adjustable link 38 and the third lever 67 has a remote end portion connected to one end of a spring 70 with the other end of said spring anchored to a pin 71 affixed to the wall 22. The spring 70 urges the lever 67 and, therefore, the bell crank 51 in a counterclockwise direction so that the second lever 66 will be urged into engagement with the threaded member 73 of the adjustable stop 74 with the lever 64 and link 38 in their counterclockwise-most position with the pedal 26 in the upmost position (FIGS. 1 and 3). The remote end of lever 66 of bell crank 51 is pivoted by pin 75 to one end of a link 76 which link 76 has its other end pivoted by pin 78 to one end of a balance lever 79. The other end of the balance lever 79 is pivoted by pin 80 to the end of link 56 which link 56, as has been described above, is connected by pin 55 to lever 52 of bell crank 50.

A crank 82 has one leg 83 pivoted on the pivot 58 carried by the wall 22 and has a second leg 84 with an angled bifurcated end portion 85 pivoted by means of pin 86 to the midpoint of the balance lever 79. A third leg 88 of crank 82 is aligned with leg 83 and is pivoted by means of pin 89 to the end of output member 12. The crank 82 is mounted for pivoting about the fixed pivot 58 so that up and down movement of pin 86 about the axis of pivot 58 will move leg 88 and pin 89 also about the axis of pivot 58 to provide linear movement of output member 12 and valve spool 16 of the four-way, three-position control valve 14.

As best shown in FIG. 3, depression of the right pedal 28 results in link 40 and lever 43 rotating the bell crank 50 in a clockwise direction. Lever 52 of bell crank 50 raises link 56 against the loading of spring 57 to pivot the balance lever 79 about the pin 78 to move the crank 82 in a counterclockwise direction about the pin 58 thereby moving output member 12 and valve spool 16 to the right. The valve 14 will permit fluid to flow in a preselected path resulting in the actuation of some desired function. If the valve 14 is controlling a drive mechanism for a hydrostatic transmission, for example, of a forklift, the forklift will be caused to turn to the right.

In similar fashion, and as is shown diagrammatically in FIG. 1, after the right pedal 28 is released it will be returned to its full upright position (FIG. 1) by means of the spring 57 returning the lever 52 against the stop 60. The left pedal 26 can be depressed and, acting through link 38 and lever 64 of the bell crank 51, will rotate bell crank 51 in a clockwise direction against the tension of the spring 70 connected to lever 67 of said bell crank. The lever 66 of the bell crank 51 will move the link 76 downward or clockwise thereby pivoting balance lever 79 about pin 80 on link 56. The pin 78 on link 76 will be moved to the position marked by a cross as 78A (FIG. 1). The clockwise movement of balance lever 79 will move pin 86 and crank 82 in a clockwise direction about fixed pivot 58 with the leg 88 of the crank 82 urging the output member 12 and valve spool 16 to the left. The pin 86 will be moved to the position 86A and the pin 89 on the crank 82 will be moved to the position 89A. Using the same example as described in the previous paragraph, the movement of the valve spool 16 to the left will actuate the transmission to cause the forklift to turn to the left. Release of the pedal 26 will permit the spring 70 to rotate the bell crank 51 in a counterclockwise direction to return the pedal 26 to the upmost position.

The locations of pins 78, 80, 86 on the balance lever 79 and the actions of the bell cranks 50,51 are such that depression of both pedals 26,28 an equal amount will result in no movement of the crank 82 and therefore no shifting of the output member 12 or valve spool 16. That is, the bell crank 50 will pivot clockwise and raise the link 56 and one end (80) of balance lever 79 an amount equal to the amount of link 76 and the end (78) of balance lever 79 is lowered by the clockwise pivoting of bell crank 51. The result is that pin 86 at the center of the balance lever 79 is not moved up or down and therefore the crank 82 and output member 12 are not moved. If, on the other hand, both pedals 26, 28 are depressed but one is depressed more than the other, the pin 86 will be moved an amount in relation to the difference in pedal movement resulting in valve actuation equivalent to said difference in movement.

In order to maintain the balance between the two bell cranks 50,51, the links 38 and 40 connected to the pedals 26,28 are provided with adjustments which lengthen or shorten said links and which adjustments can periodically be made so that the resulting movements of the valve spool 16 is equal in each direction. Likewise, the threaded members 73 and 61 of the adjustable stops 74 and 60, respectively, can be turned up or down so that the valve spool 16 is precisely centered in the neutral position when the pedals 26,28 are in the fully up position.

The concentric, relatively rotatable mounting of the cross-shaft 42 (of bell crank 50) and the sleeve 65 (of bell crank 51) makes it possible to actuate one pedal without in anyway causing actuation or movement of the other pedal and vice versa, thus overcoming one of the problems of the prior art where actuation of one pedal automatically resulted in actuation or movement of other pedal. The pedals 26,28 are not interconnected or interlocked and, therefore, one pedal is not actuated or moved by the other.

I claim:

1. In a bidirectional control arrangement having a pair of individually operative pedals pivoted on a housing and an output member linearly reciprocable between a neutral position and two opposite extreme positions, in combination with an actuator mechanism for transmitting movement of said pedals to movement of said output member, said actuator mechanism comprising a cross-shaft, a pair of levers keyed to said cross-shaft and extending generally in opposite directions from said cross-shaft, one of said levers being connected to one of said foot pedals and the other of said levers being pivotally connected to a link, a sleeve concentrically mounted on said cross-shaft and having first ans second radially extending levers connected thereto, the first of said levers being connected to the other of said foot pedals, the second of said levers extending from the same side of the sleeve as said first lever and being pivotally connected to a link, a balance lever pivotally connected at one end to the link on the other lever on the cross-shaft and connected at the other end to the link on the second lever on said sleeve, a crank pivotally mounted on the housing and having one lever connected to the midpoint of the balance lever and having another lever connected to the output member whereby downward movement of either pedal will pivot the balance lever and move the output member toward one of the extreme positions.

2. In the bidirectional control arrangement of claim 1 wherein a link is pivotally connected between the lever on the cross-shaft and the pedal, said link having means for adjusting the length of said link for varying the height of the pedal above a platform on the housing, and a second link is pivotally connected between the second lever on the sleeve and the pedal, said second link having means for adjusting the length of said link for varying the height of the other pedal above the platform on the housing.

3. In the bidirectional control arrangement of claim 1 wherein means are provided for urging both pedals in the up position.

4. In the bidirectional control arrangement of claim 1 wherein a spring means urges said pair of levers and said cross-shaft in a counterclockwise direction with one of said levers being urged against a stop with the associated pedal urged in the up position, and said sleeve has a third lever projecting outwardly therefrom and being connected to a second spring means for urging said sleeve and said associated three levers in a counterclockwise direction with one of said levers being urged against a stop with the associated pedal urged in the up position.

5. In the bidirectional control arrangement of claim 4 wherein said stops are adjustable.

6. In a bidirectional control arrangement having a housing, a pair of individually operative pedals pivoted on said housing, an output member linearly reciprocable between an opposite pair of extreme positions, in combination with an actuator mechanism for transmitting pivotal movement of each of said pedals to linear movement of said output member, said actuator mechanism comprising a first bell crank pivotally mounted on said housing and having a pair of levers extending in opposite directions with one of said levers connected to one of said pedals and the other of said levers being pivotally connected to a link, means for urging said pedal in an up position, a second bell crank pivotally mounted concentrically on said first bell crank and having first and second radialy extending levers connected thereto, the first of said levers being connected to the other of said foot pedals, the second of said levers extending from the same side of the bell crank as said first lever and being pivotally connected to a link, means for urging said other foot pedal in an up position, a balance lever pivotally connected at one end to the link on the other lever on the first bell crank and connected at the other end to the link on the second lever on said second bell crank, means pivotally mounted on the housing and having one portion connected to the midpoint of the balance lever and having another portion connected to the output member whereby downward movement of either pedal will pivot the associated bell crank and the balance lever to move the output member toward one of the extreme positions.

7. In the bidirectional control arrangement of claim 6 wherein said means for urging said pedal in an up position is a spring means which urges one of the levers on the first bell crank against an adjustable stop and wherein said means for urging said other pedal in an up position is a spring means which urges one of the levers of the second bell crank against an adjustable stop.

8. In the bidirectional control arrangement of claim 6 wherein means are provided between the levers on the first and second bell cranks and the two pedals which means are adjustable for varying the distance between the levers on said first and second bell cranks and said two pedals.

9. An actuator mechanism for a bidirectional control comprising a housing, a pair of individually operative pedals pivoted on said housing, an output member linearly reciprocable between at least two positions, a first bell crank means being pivotally mounted on said housing and being connected to one of said pedals, a second bell crank means being concentrically mounted relative to said first bell crank means and being connected to the other of said pedals, a lever carried by said first bell crank means and projecting in a direction opposite to the portion of the first bell crank means connected to said one pedal, a lever carried by said second bell crank means and projecting in the same direction as the portion of the second bell crank means connected to said other pedal, a first link connected to the lever carried by said first bell crank means, a second link connected to the lever carried by said second bell crank means, a balance lever pivotally connected at each end to the first and second links on the levers of the first and second bell crank means, a crank member pivotally mounted on the housing and having one lever connected to the midpoint of the balance lever and having another lever connected to the output member whereby downward movement of either pedal will pivot the bell crank means associated with said pedal to pivot the balance lever about the pivotal connection between said balance lever and the link carried by the other bell crank means to pivot the crank member and move the output member in one direction.

10. The actuator mechanism for a bidirectional control as claimed in claim 9 wherein means are provided for urging both bell cranks in a counterclockwise direction against adjustable stops with said pedals held in an up position.

* * * * *

UNITED STATES PATENT OFFICE
CERTIFICATE OF CORRECTION

PATENT NO. : 3,910,133
DATED : October 7, 1975
INVENTOR(S) : Eldon D. Oestmann

It is certified that error appears in the above-identified patent and that said Letters Patent are hereby corrected as shown below:

On the Title Page, Item [73], change the spelling of the assignee's corporate name from "Caterpillar Tractor Company" to ---Caterpillar Tractor Co.---.

Signed and Sealed this sixteenth Day of March 1976

[SEAL]

Attest:

RUTH C. MASON
*Attesting Officer*

C. MARSHALL DANN
*Commissioner of Patents and Trademarks*